(12) United States Patent
Stroel

(10) Patent No.: US 7,212,294 B2
(45) Date of Patent: May 1, 2007

(54) METHOD FOR DETERMINATION OF THE LEVEL OF TWO OR MORE MEASUREMENT POINTS, AND AN ARRANGEMENT FOR THIS PURPOSE

(75) Inventor: Klaus Stroel, Ismaning (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 381 days.

(21) Appl. No.: 10/833,349

(22) Filed: Apr. 28, 2004

(65) Prior Publication Data
US 2005/0002044 A1  Jan. 6, 2005

(30) Foreign Application Priority Data
Apr. 29, 2003 (DE) .................. 103 19 369

(51) Int. Cl.
*G01B 11/14* (2006.01)
*G01B 11/26* (2006.01)
(52) U.S. Cl. .................. 356/622; 356/139.07
(58) Field of Classification Search ........ 356/614–622, 356/139.07, 4.01–5.15, 141.1, 152.1–152; 250/203.2; 33/291, 281, 286; 359/668
See application file for complete search history.

(56) References Cited

U.S. PATENT DOCUMENTS

| | | | |
|---|---|---|---|
| 3,649,122 A | | 3/1972 | Holtz |
| 3,972,620 A | | 8/1976 | Nauth |
| 4,293,199 A | * | 10/1981 | Wada et al. ............. 351/211 |
| 4,297,031 A | * | 10/1981 | Hamar ..................... 356/247 |
| 4,309,093 A | * | 1/1982 | Kuwayama et al. ...... 396/271 |
| 4,441,818 A | * | 4/1984 | Wickman .................. 356/622 |
| 4,483,618 A | * | 11/1984 | Hamar ..................... 356/400 |

(Continued)

FOREIGN PATENT DOCUMENTS

DE    199 41 030 C1    4/2001

(Continued)

OTHER PUBLICATIONS

Patent Abstracts of Japan Bd. 2000, Nr. 11, Jan. 3, 2001 & JP 2000-213937 A (Asahi Optical Co Ltd), Aug. 4, 2000.

(Continued)

*Primary Examiner*—Sang H. Nguyen
(74) *Attorney, Agent, or Firm*—David S. Safran

(57) ABSTRACT

A method and arrangement for determining the level of at least two measurement points with a light beam direct along a first direction and being deflected through 90° with respect to the first direction to a second direction, the second direction being rotated through a rotation angle corresponding to the position of the measurement point about an axis which is formed by the first direction. The light beam has a cross-sectional intensity distribution with a preferred direction, and after being deflected to the second direction, falls on a detector surface which is positioned successively at each measurement point, the incidence level of the light beam and the orientation of the preferred direction of the cross-section intensity distribution of the light beam on the detector surface being determined for each measurement point, and the rotation angle for each measurement point being determined from the respective orientation of the preferred direction on the detector surface.

15 Claims, 9 Drawing Sheets

U.S. PATENT DOCUMENTS

| | | | |
|---|---|---|---|
| 4,498,773 A * | 2/1985 | von Bieren | 356/516 |
| 4,718,171 A * | 1/1988 | Schlemmer et al. | 33/290 |
| 4,854,704 A * | 8/1989 | Funazaki et al. | 356/250 |
| 4,878,754 A * | 11/1989 | Homma et al. | 356/602 |
| 5,530,549 A * | 6/1996 | Brown | 356/622 |
| 5,825,555 A * | 10/1998 | Oono et al. | 359/668 |
| 5,907,907 A * | 6/1999 | Ohtomo et al. | 33/291 |
| 6,437,859 B1 * | 8/2002 | Ohtomo et al. | 356/139.07 |
| 2002/0060788 A1 | 5/2002 | Ohtomo et al. | |
| 2003/0025902 A1 | 2/2003 | Hedges et al. | |

FOREIGN PATENT DOCUMENTS

| | | |
|---|---|---|
| EP | 1 245 926 A2 | 10/2002 |
| JP | 2000-046551 | 2/2000 |
| JP | 2000-213939 | 8/2000 |

OTHER PUBLICATIONS

Patent Abstracts of Japan Bd. 2000, Nr. 05, Sep. 14, 2000 & JP 2000-046551 A (Asahi Optical Co Ltd), Feb. 18, 2000.

* cited by examiner

METHOD FOR DETERMINATION OF THE LEVEL OF TWO OR MORE MEASUREMENT POINTS, AND AN ARRANGEMENT FOR THIS PURPOSE

BACKGROUND OF THE INVENTION

1. Field of the Invention

The present invention relates to a method and an arrangement using a detector surface and a light source for determination of the level of two or more measurement points, a light beam being produced along a first direction, the light beam being deflected through 90° with respect to the first direction to a second direction, with the second direction being rotated through a rotation angle corresponding to the position of the measurement point about an axis which is formed by the first direction.

2. Description of Related Art

A method and an arrangement of the generic type described above are known from Japanese patent publications JP 2000-46551 and JP 2000-213937, respectively, with the beam direction of a laser being steered accurately in a desired azimuth rotation direction. For this purpose, the beam of a laser diode which is emitted vertically upwards is deflected through 90° by means of a pentagonal prism. The pentagonal prism rotates the laser beam in a plane at right angles to the emission direction. An encoder with a round encoder plate is used in order to determine the respective rotation angle of this rotation, and the rotation angle is evaluated via an encoder sensor. In order to determine the position of a measurement point in this way, its height z above a horizontal reference plane (for example, the rotation plane of the laser beam) must be determined by means of an additional measurement method, using cylindrical coordinates, and its radial distance from a vertical reference axis (for example, the emission axis of the laser) must be determined by means of a further measurement method.

SUMMARY OF THE INVENTION

The object of the present invention is to provide an arrangement and a method for determination of the level of two or more measurement points, which arrangement and method allow the precise measurement of the rotation angle and the height by means of a single measurement method and detector, thus simplifying the measurement and reducing the production costs and physical size of the arrangement.

According to the invention, this object is achieved by a method and by an apparatus wherein the light beam has a cross-section intensity distribution with a preferred direction, and after being deflected to the second direction, falls on the detector surface, which can be arranged successively at each measurement point, and with the detector surface being designed to determine the incidence level of the light beam and the orientation of the preferred direction of the cross-section intensity distribution of the light beam on the detector surface for each measurement point.

In this case, it is advantageous that the rotation angle of the respective measurement point with respect to the light source can be determined by detection of the preferred direction of the cross-section intensity distribution of the light beam on the detector surface for each measurement point, without any additional measurement for the actual level measurement, so that only the distance from the light source need be determined in order to determine the spatial coordinates of each measurement point.

The light beam is preferably an emission beam from a semiconductor laser, in which the emitted light already includes a preferred direction of the cross-section intensity distribution. The detector is preferably a CCD chip, and the element for deflection of the light beam through 90° is preferably a pentagonal prism.

By way of example, further preferred refinements of the invention will be explained in more detail in the following text with reference to the accompanying drawings.

BRIEF DESCRIPTION OF THE DRAWINGS

FIG. 2 is a plan view of the arrangement as shown in FIG. 1a;

DETAILED DESCRIPTION OF THE INVENTION

Figure 1A:
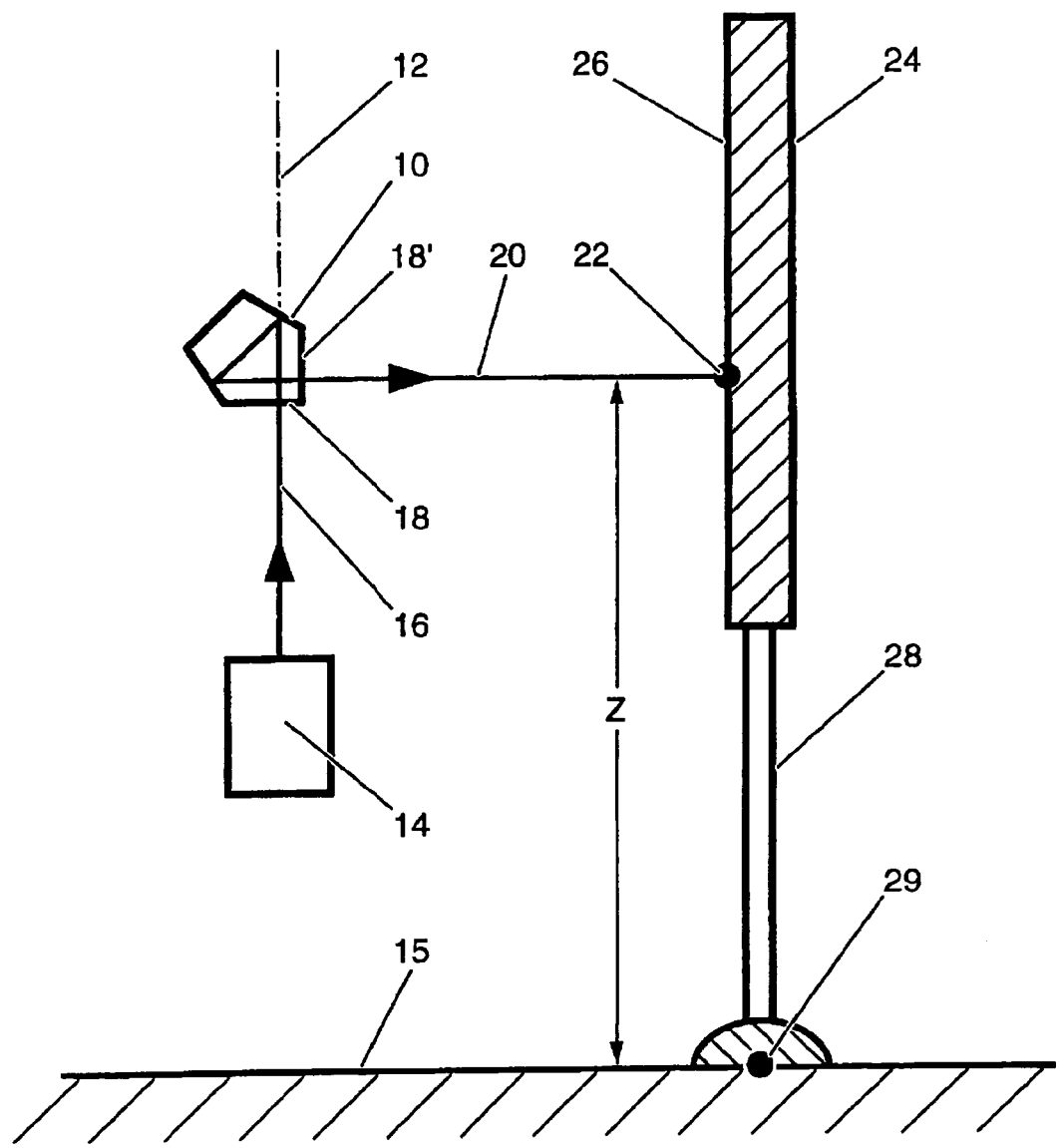
FIGS. 1a and 1b each show a schematic side view of an arrangement according to the invention for determination of the coordinates of a measurement point which lies on a reference plane, or which lies a specific distance above the reference plane.

FIG. 1a shows a schematic side view of an arrangement according to the invention, with a pentagonal prism 10 being fitted to a holder, which is not shown in the figure (see, e.g., FIGS. 4 & 5), and the pentagonal prism 10 can be fixed on the holder such that it can rotate about a vertical axis 12. A beam emerges from a light source 14, which is preferably a semiconductor laser and is fixed above a plane 15 by means of a holder (not shown) in a direction 16 which preferably points vertically upwards, and is incident on a surface 18 of the pentagonal prism 10. The plane 15 may, for example, be a building foundation slab, which is intended for a machine to be installed on, and which should be designed with respect to any local unevenness. A pentagonal prism has the known characteristic that a light beam which is incident on one of the surfaces 18 or 18' is always reflected rotated through 90° irrespective of the incidence angle, and is thus deflected without having to change the orientation of the corresponding image, with a change in the incidence angle leading only to a parallel offset of the deflected beam. However, in principle, other deflection elements may also be used, such as a normal planar mirror, an angled mirror 102 (which can be provided on a surface of the prism 10 as shown in FIG. 6 or via a separate mirror) or an appropriately curved group of optic fibers.

As is shown in FIG. 1a, the directions 16 and 20 of the incident and reflected beam in the illustrated example lie on a plane which is at right angles to the respective surfaces 18 and 18'. After this deflection, the beam is horizontally incident on a detector 24 with a detector surface 26 at an incidence point 22 located at a height z above the plane 15. The detector surface 26 is preferably a CCD chip (which, in particular, provides two-dimensional detection) or a CMOS sensor, and is designed such that a large number of pixels allow the three-dimensional image of the cross-sectional intensity distribution of the incident beam to be determined. The holder 28 may be shifted on the plane 15 and may, in this way, be positioned at a measurement point 29 on the plane 15. The aim is to use the method described in the following text to detect the vertical level of the measurement point 29 with regard to the plane 15, and the horizontal position of the measurement point 29 on the plane 15.

Figure 1B:
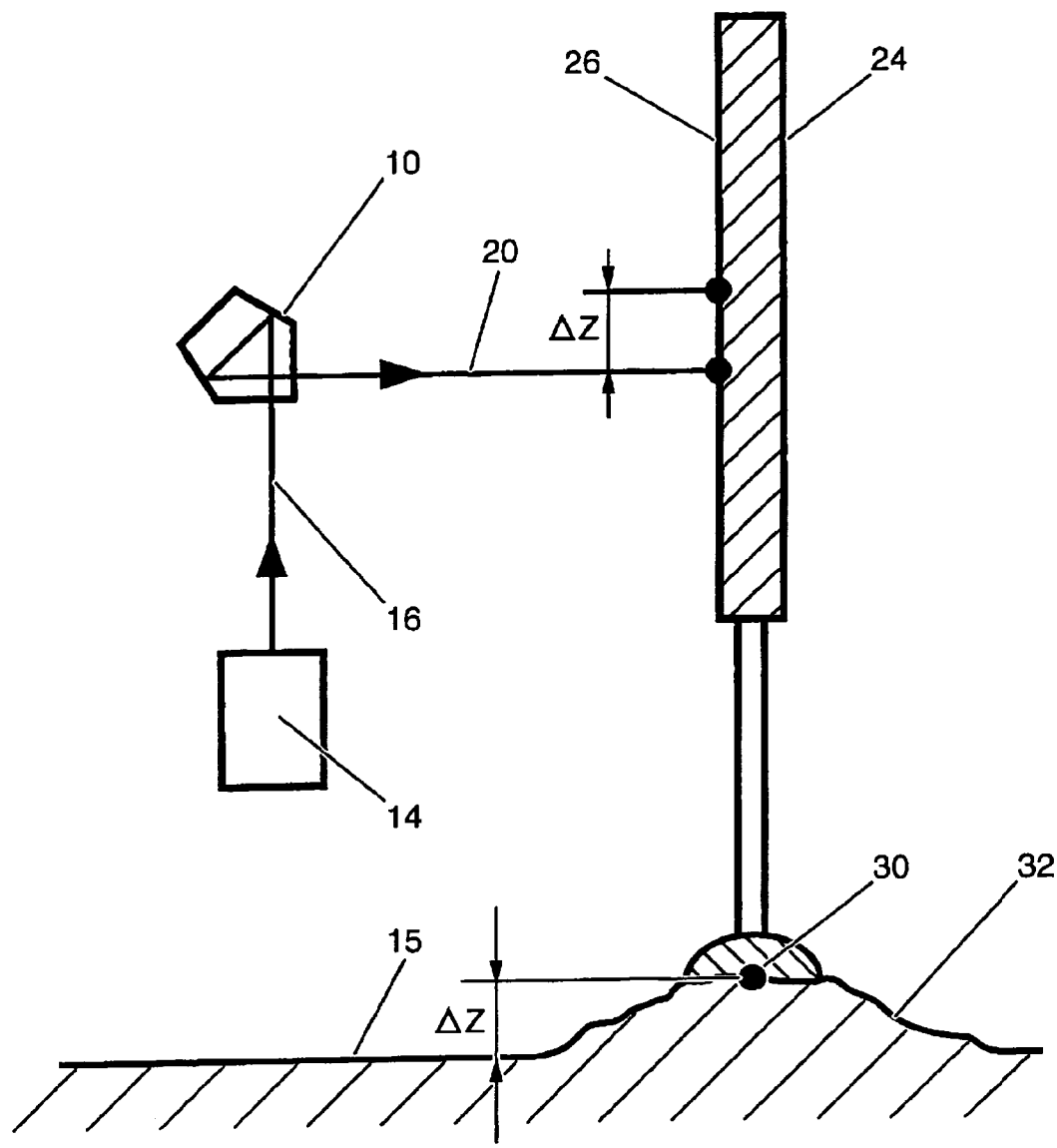

FIG. 1*b* shows a situation corresponding to that shown in FIG. 1*a*, but with the measurement point 30 now being located on an unevenness 32 above the plane 15. The horizontal beam in the direction 20 is now incident on the deflector surface 26 at a height reduced by $\Delta z$, assuming that the height of the unevenness is $\Delta z$. The respective height may easily be determined by reading the CCD chip and determining the centroid of the light intensity distribution by means of image processing software. Where measurements are carried out at different measurement points, the relative height changes can thus be obtained directly. The vertical discrepancies between different measurement points with regard to the plane 15 can thus be detected.

In order to detect the horizontal position of the measurement points, two further spatial coordinates must also be determined for each measurement point. This may be done, for example, using cylindrical coordinates, where the two additional coordinates are then the angle $\phi$ (azimuth) and the radius R.

Figure 2:
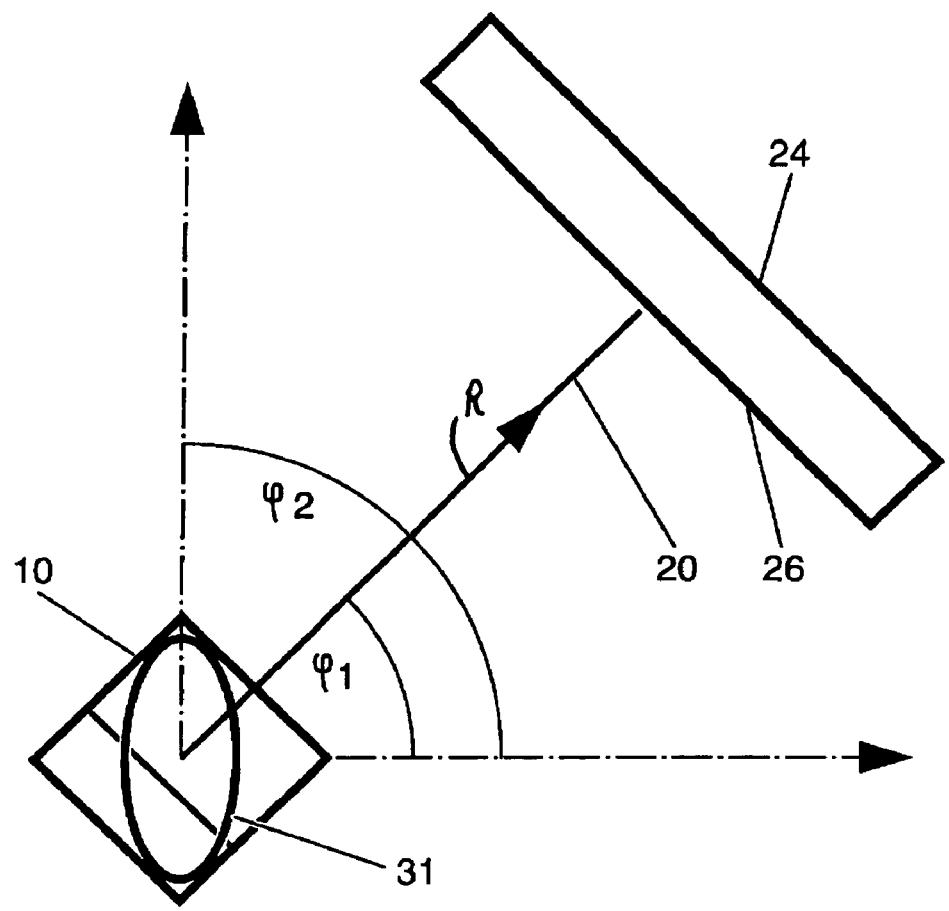

FIG. 2 shows a view from above of the arrangement shown in FIG. 1*a*. The deflected beam in the direction 20 is emitted at an angle $\phi 1$ with respect to a reference direction onto the detector 24. In this case, $\phi 1$ is 45°. The use of a pentagonal prism for beam deflection in this case has the advantage that any tilting of the prism with respect to the vertical in all cases leads to a beam offset but not any tilting from the horizontal. This allows errors in the determination of the horizontal discrepancy between the measurement points to be kept small.

FIG. 2 likewise shows the directions $\phi 2=90°$ and $\phi 3=0°$ of two other measurement points.

The beam which is emitted along the direction 16 has a preferred cross-section intensity distribution direction. In FIG. 2, the beam which is emitted along the direction 16 has lines of constant light intensity with an elliptical shape (one of which is indicated by way of example annotated by the reference symbol 31 in FIG. 2) with a preferred direction (that is to say with the ellipse has a longitudinal axis of symmetry). The preferred direction of the ellipse 31 in the example shown in FIG. 2 is in the direction $\phi=90°$.

Figure 3A:
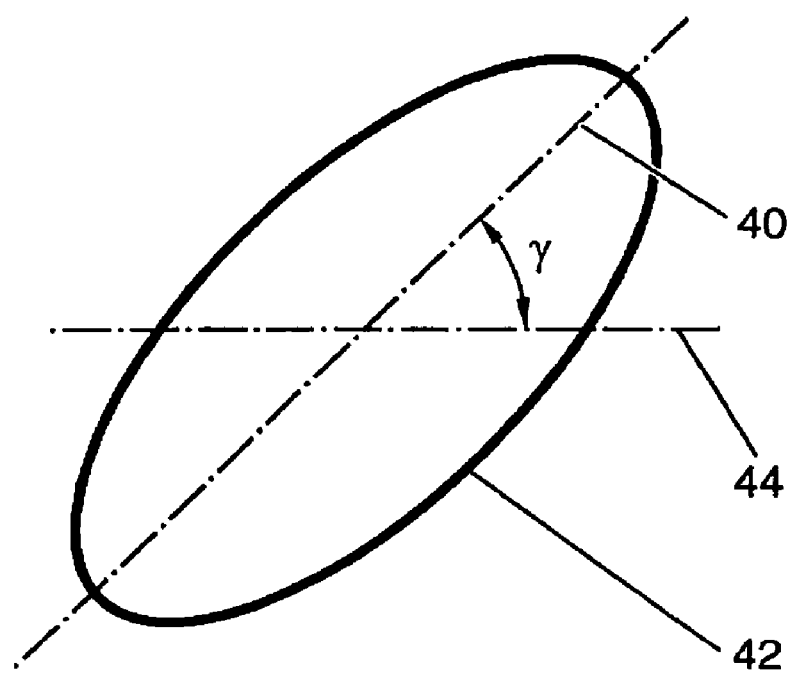
FIGS. 3a, b and c schematically show the imaging of the laser beam on the detector for rotation angles of the deflected beam of 45°, 90° and 0°.
Figure 3B:
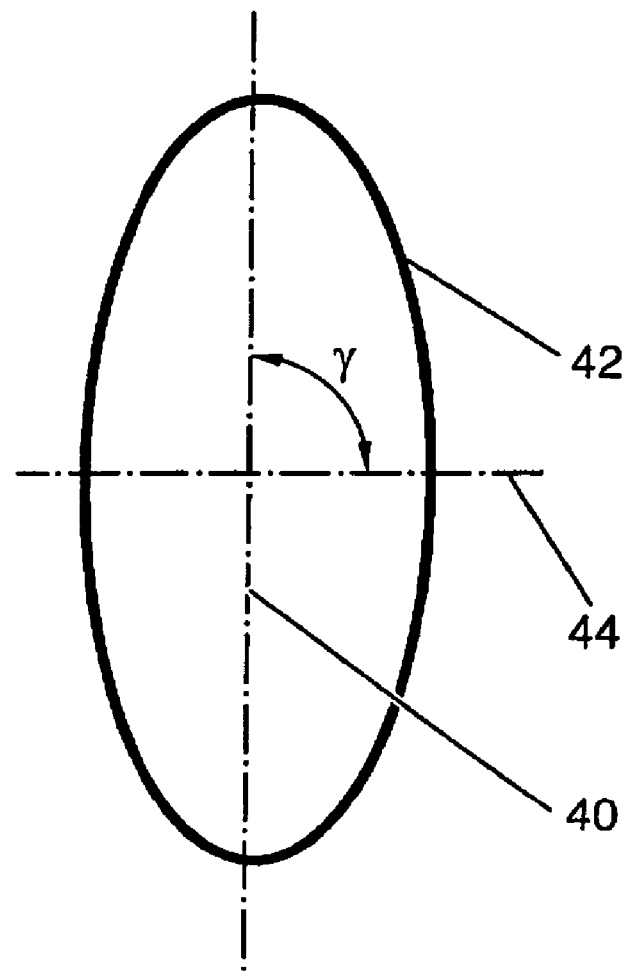
Figure 3C:
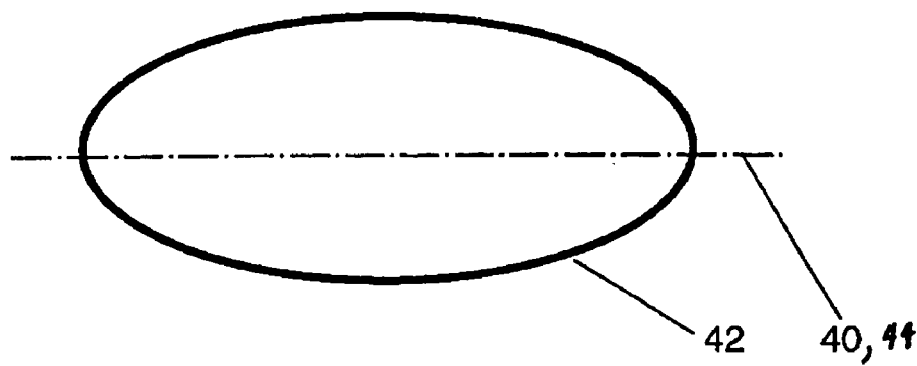

FIGS. 3*a*, 3*b* and 3*c* schematically illustrate the cross-sectional intensity distributions as lines of constant intensity 42 of the horizontal beam deflected in the direction 20 when it is incident on the detector surface 26 for the three directions $\phi 1=45°$, $\phi 2=90°$ and $\phi 3=0°$ of the beam in the direction 20, respectively. There is a linear relationship between the angle orientation $\gamma$ of the preferred direction 40 of the cross-sectional intensity distribution on the detector surface 26 with respect to a reference direction 44 and the generally azimuth rotation angle $\phi$ of the measurement point. To be more precise, the angle $\phi$ is, in this case, once again incident at the angle $\gamma$ between the preferred direction 40 of the cross-sectional intensity distribution and the reference direction 44.

For example, if the pentagonal prism 10 is rotated through 360° about the vertical axis 16, the preferred direction 40 of the cross-section intensity distribution is also rotated through 360° on the detector surface 26 (which must, of course, be moved at the same time such that the sensor can detect the cross-sectional intensity distribution). The rotation angle $\phi$ of the beam in the direction 20 for the respective measurement point can thus be determined by evaluation of the cross-section intensity distribution of the light beam on the detector surface 26, by reading the CCD chip and by determining the angle $\gamma$ between the reference direction 44 and the determined preferred direction 40 of the cross-sectional intensity distribution. This evaluation can be carried out by the image processing software, which also determines the centroid of the cross-sectional intensity distribution on the detector surface 26, and hence the height of the incidence point of the laser beam on the detector surface 26. For example, this is done by first of all determining the outline contour of the intensity distribution, after which the centroid can then be determined on this basis.

As described above, the radial distance between the measurement points and the origin axis—which is in this case defined by the beam in the direction 16—is also required in order to determine the position of the various measurement points. Methods for doing this are known to those skilled in the art and will therefore not be described in any more detail.

Figure 4:
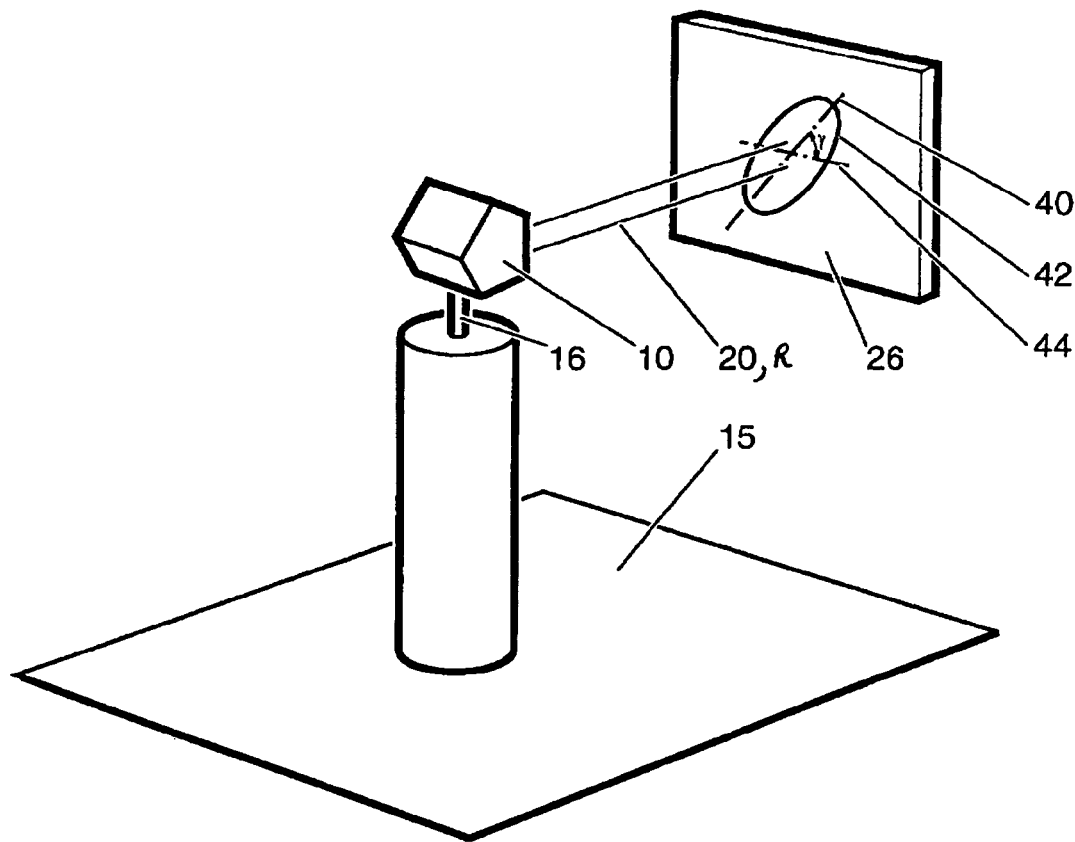
FIG. 4 is a schematic perspective view of the arrangement as shown in FIG. 1, with the detector being positioned at a measurement point which is located in the direction of a rotation angle φ of 45°.

FIG. 4 shows a perspective illustration of the arrangement shown in FIGS. 1*a*, 2 and 3*a* for a rotation angle of 45°. As is shown, the preferred direction 40 of the cross-sectional intensity distribution is likewise rotated through 45° with respect to the horizontal.

Figure 5:
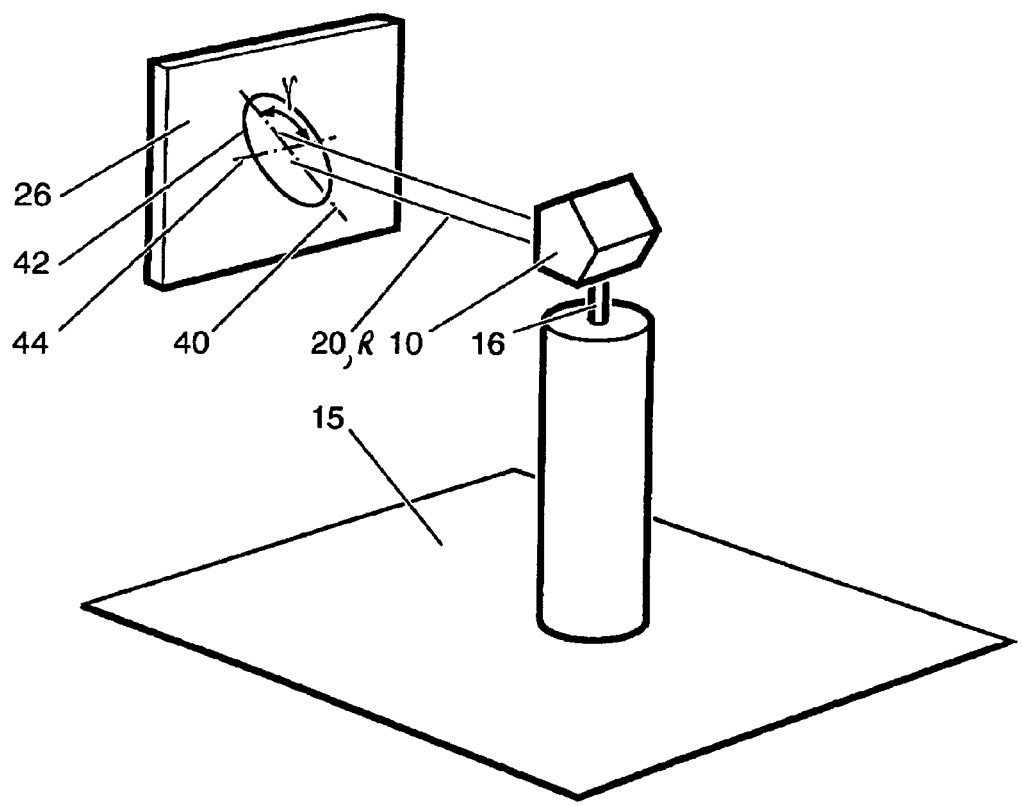
FIG. 5 is a schematic perspective view corresponding to that shown in FIG. 4, with the detector in this case being positioned at a different measurement point which is located in the direction of a rotation angle φ of 135°.
Figure 6:
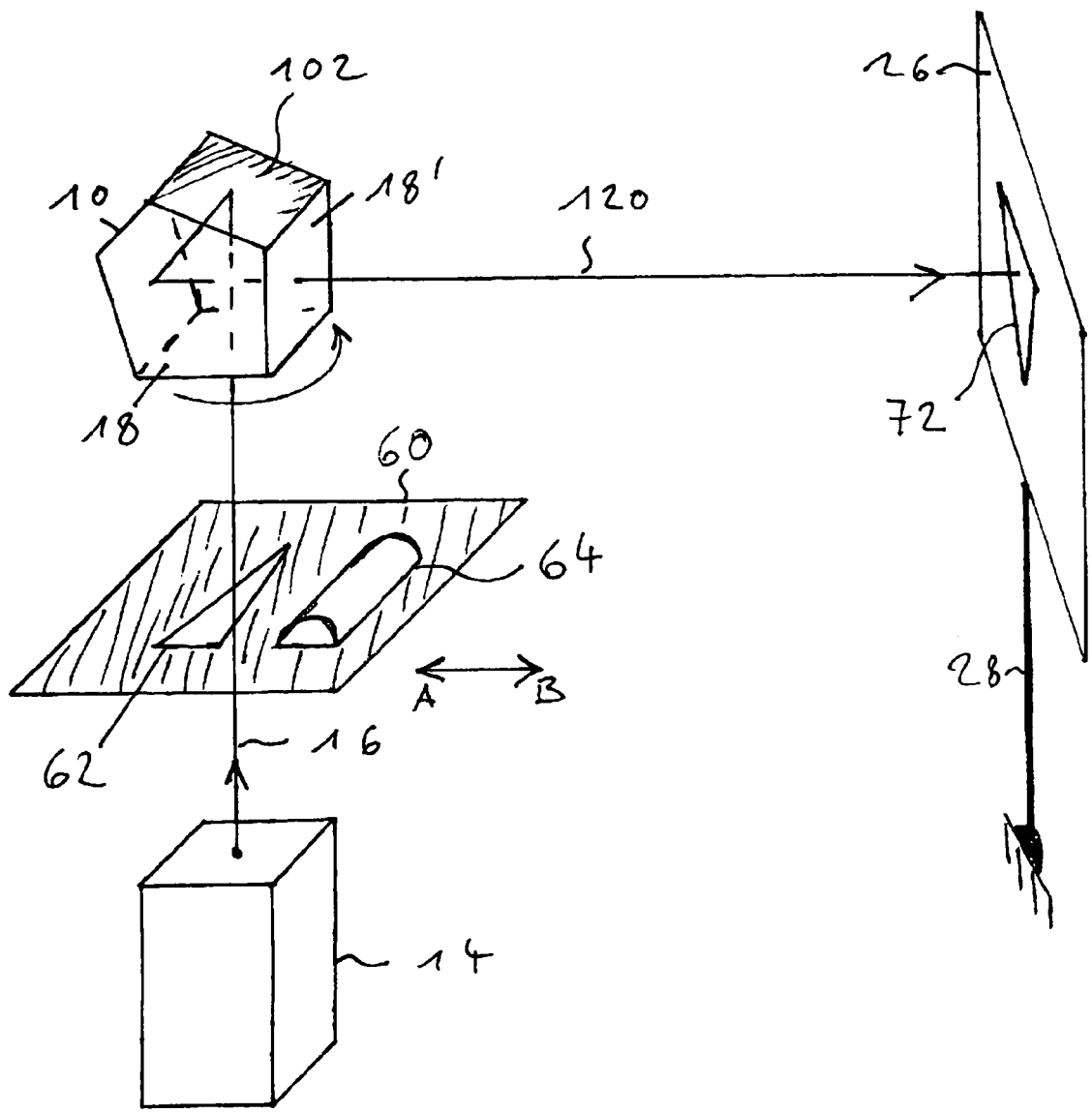
FIG. 6 is a schematic representation of an alternative embodiment.

FIG. 5 shows a similar illustration to that in FIG. 4, but for a rotation angle of 135°. The preferred direction 40 of the cross-sectional intensity distribution is rotated in a corresponding manner through 135° with respect to the horizontal in this case.

The advantage of the method and apparatus according to the invention is the capability to determine a second spatial coordinate as well by means of the detector 24 which is used for measurement of the z coordinate of the incidence point 22, that is to say the angle $\phi$. There is no need for any additional sensor system, such as an encoder as used in the prior art with a round encoder plate and encoder sensor for determination of the rotation angle $\phi$. This allows the production costs and size of the arrangement to be reduced considerably, and in addition, the measurement method can be simplified overall.

The advantage from using a semiconductor laser is the fact that, in this case, the cross-sectional intensity distribution of the laser beam intrinsically has a preferred direction and there is no need to produce such a preferred direction by means of an additional lens system.

In a further embodiment of this invention shown in FIG. 6, the cross-sectional intensity distribution is not elliptical but rather has a cross-sectional shape which is not centrally symmetrical, as can be achieved by an appropriate optical element, for example, by a triangular aperture 62 formed in an aperture plate 60. The advantage of this embodiment is that it also allows measurements to be carried out over the complete angle range of 360°, while a centrally symmetrical shape allows measurements only up to 180°. Rotation of the prism 10 causes the image 72 (which is the same shape as the aperture 62) to rotate. Thus, the use of a cross-sectional intensity distribution shape such as this which is not centrally symmetrical would then make it possible to determine whether the rotation angle $\gamma$ is, for example, 135°, or is 315° instead.

Alternatively, the cross-sectional intensity distribution, which must not be radially symmetrical, can be formed by a cylindrical lens 64 or by a lens system. Furthermore, both the lens 64 and the aperture 62 can be formed on the same plate 60, the plate being mounted to shift horizontally in the directions A and B to enable selection of either the cylindrical lens 64 or the aperture 62.

The invention claimed is:

1. A method for determination of the level of at least two measurement points with respect to each other, comprising the steps of:
   producing a light beam having a cross-sectional intensity distribution with a preferred direction and directing the light beam in a first direction,
   deflecting the light beam through 90° with respect to the first direction to a second direction, with the second direction being rotated through a rotation angle corresponding to a position of the measurement point about an axis formed by the first direction,
   receiving the light beam deflected to the second direction on a detector surface which is positioned successively at each measurement point by movement of the detector surface and without changing the position at which the light beam is deflected,
   determining the incidence level of the light beam and the orientation of the preferred direction of the cross-sectional intensity distribution of the light beam on the detector surface for each measurement point,
   determining the rotation angle for each measurement point from the respective orientation of the preferred direction on the detector surface; and
   determining the level of the measurement points with respect to each other based upon the incidence level and rotational angle determined for each measurement point on the detector surface itself.

2. The method as claimed in claim 1, wherein the incidence level of the measurement points is determined as a distance relative to a reference plane, with the first direction being at right angles to the reference plane.

3. The method as claimed in claim 1, wherein the reference plane is determined as a compensation plane relative to the measured levels of the measurement points.

4. The method as claimed in claim 1, wherein a lens system or an aperture is positioned between the light source and the detector in order to produce the preferred direction of the cross-sectional intensity distribution of the light beam.

5. The method as claimed in claim 1, wherein a semiconductor laser, whose light intensity in the far field has a preferred direction of the cross-sectional intensity distribution, is used as the light source.

6. The method as claimed in claim 1, wherein the detector is an area sensor.

7. An arrangement for determination of the level of at least two measurement points (29, 30), having a detector surface (26) and having a light source (16) which is designed to produce a light beam along a first direction (16), having a fixed deflection device (10) in order to deflect the light beam through 90° with respect to the first direction to a second direction (20), in which case the deflection device can be rotated about an axis (12) which is formed by the first direction in order to rotate the second direction to correspond to the position of the respective measurement point, wherein the light beam has a cross-section intensity distribution (40) with a preferred direction (42) and, after being deflected to the second direction, falls on the detector surface (26), which is movable successively to each measurement point (29, 30), and with the detector surface being designed to determine the incidence level of the light beam and the orientation of the preferred direction of the cross-section intensity distribution of the light beam on the detector surface for each measurement point.

8. The arrangement as claimed in claim 7, wherein the deflection device comprises one of a pentagonal prism, a mirror and a group of fibers.

9. The arrangement as claimed in claim 7, wherein the detector surface is an image detection sensor having at least two columns and rows of light-sensitive elements.

10. The arrangement as claimed in claim 9, wherein the image detection sensor is one of a CCD chip and a CMOS sensor.

11. The arrangement as claimed in claim 7, wherein the light source is a laser.

12. The arrangement as claimed in claim 11, wherein the light source is a laser diode, with the light beam having an elliptical cross-section intensity distribution in the far field of the laser diode.

13. The arrangement as claimed in claim 7, wherein a lens system having at least one cylindrical lens is located between the light source and the deflection device (10).

14. The arrangement as claimed in claim 7, wherein at least one optical element with an opening that is not radially symmetrical is located between the light source and the deflection device.

15. The arrangement as claimed in claim 14, wherein the opening is not centrally symmetrical.

* * * * *